Sept. 13, 1932. A. TEN BROOK 1,877,433
FITTING
Filed Feb. 9, 1931
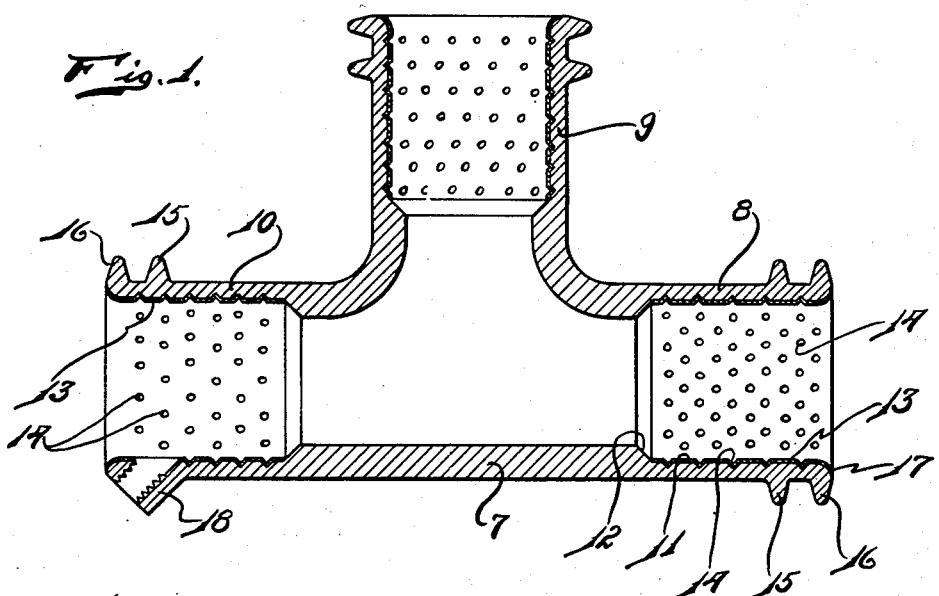
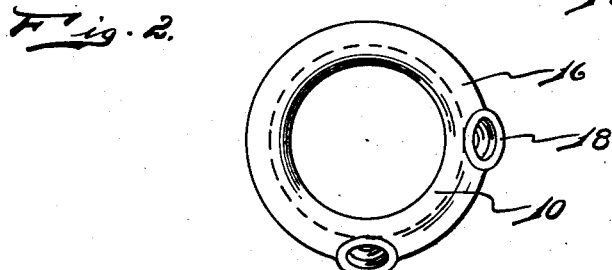
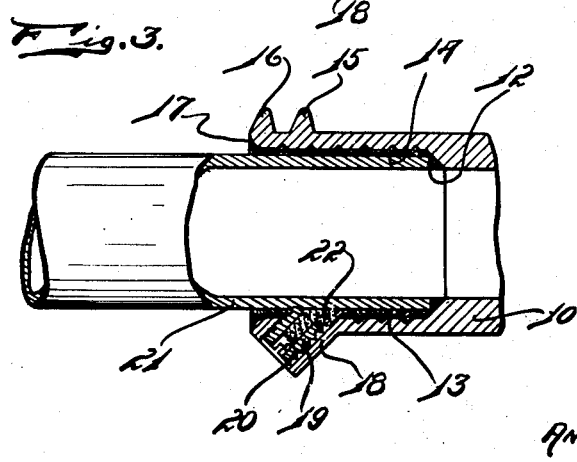
INVENTOR.
ANDREW TEN BROOK
BY
ATTORNEY.

Patented Sept. 13, 1932

1,877,433

UNITED STATES PATENT OFFICE

ANDREW TEN BROOK, OF DETROIT, MICHIGAN

FITTING

Application filed February 9, 1931. Serial No. 514,452.

My invention relates to a new and useful improvement in a fitting adapted for use as a connection between pipes and conduits generally, and may be used in the form of L's, T's, quarter bends, couplings, etc. in which construction the end of the pipe or conduit is inserted into the fitting and sealed therein by a suitable sealing medium such as solder or the like.

It is an object of the present invention to provide a fitting of this class in which a seat may be provided for engagement with the end of the pipe or conduit which may be held in position thereagainst by a suitable engagement member such as a set screw or the like.

It is another object of the invention to provide a fitting of this class having a pipe receiving portion and provided on its inner surface with a layer of tinning or other suitable material adapted to co-operate with the solder or molten material placed therein to effect a close bond between the fitting and the conduit or pipe.

Another object of the invention is the provision of a fitting of this class having a pipe receiving portion and provided with peripheral projections for facilitating heat radiation thereof.

It is another object of the invention to provide a fitting of this class having a pipe receiving portion provided on its inner surface with pockets or recesses to facilitate the travel of solder or molten material around the periphery of the pipe inserted therein and also to provide a more secure bond between the various parts.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central vertical sectional view of a T embodying the invention.

Fig. 2 is an end elevational view of the invention.

Fig. 3 is a fragmentary central sectional view of the invention showing a pipe or conduit in position.

In the drawing I have illustrated the invention applied to a T, and from the description it will become obvious that the invention is adapted to any type of fitting having a pipe receiving portion or a pipe entering portion. The main body 7 of the T is provided with the pipe receiving portions 8, 9 and 10, each of which is similarly constructed for reception of the end of a pipe 21. The pipe receiving end is reamed out to provide the bore 11 of sufficient size for reception of the end of the pipe 21. This bore 11 terminates at its inner end in the inclined seat 12 against which the end of the pipe 21 engages to provide a seal. Formed in the inner surface of the bore 11 are pockets 14, and this inner surface is tinned so as to provide the layer 13 of tinning or bonding material. Radially projecting fins 15 and 16 extend outwardly from the periphery of the pipe receiving end or portion.

In use this fitting, after the pipe is inserted in the pipe receiving portion or bore, is heated to desired temperature and solder or sealing material is inserted therein. The fins 15 and 16 facilitate the cooling of the fitting, particularly at its open end, the purpose of which will appear herein. As shown in the drawing the outer end of the pipe receiving portion is flared as at 17 and this flared portion is also covered with the layer of tin or bonding material. Projecting outwardly from the periphery of the pipe receiving portions are the bosses which are drilled and reamed to provide interiorly threaded nozzle forming members leading into the bore 11. A plug 19, which functions as a set screw, is threaded into the nozzle 18 to engage the pipe 21 and force it inwardly into engagement with the seat 12 tightly and retain the same in this position. This plug 19 is formed with the central passage 20 through which may be inserted the solder 22. This plug also, because of its tight engagement with the pipe 21, makes it possible to install a number of lengths of the pipe before the insertion of the solder is carried on, all of these lengths of pipe being held in rigid assembly by the plug 19.

By providing the fitting, as an article of manufacture, with the pipe receiving end tinned on its inner surface or provided with a layer of bonding material, the efficiency of the device is considerably increased over a fitting which is not so provided. This is due primarily to the easy cleaning of the layer and the less likelihood of foreign material adhering thereon, so that when the sealing material is inserted therein an intimate bond results. Also the presence of the tin coat serves to clearly indicate when the fitting is raised to the desired degree of temperature for efficient sealing or bonding. When solder is used it is desirable that the fitting be at a certain temperature before the solder is inserted, and a variation of this temperature a few degrees either way will considerably affect the binding effect which is accomplished by the molten sealing material.

When the fitting is provided with a layer of tin or bonding material, this bonding material will indicate a "sweat" or a vaporous film when the fitting has been raised to the desired temperature. Also, on account of the amalgamating effect of the layer of tin, a more secure bonding effect will result.

In use, the pipe 21 is inserted into the position shown in Fig. 3, and if desired, the plug 19 may be threaded into locking position. The solder or molten sealing material is then poured through the passage 20, and on account of the slight clearance around the periphery of the pipe 21 and on account of the presence of the pockets 14, the solder or molten material will entirely encircle the pipe 21 and effect between the pipe 21 and the pipe receiving portion a close and intimate bond, thus securely fastening these parts together and providing a leakproof connection capable of withstanding normal pressures to which the same would be subjected in the ordinary course of its use. The pockets 14 will also facilitate this secure binding of the parts together and prevent undue separation of the fitting and the pipe. It is evident in order to prevent a waste of the solder or sealing material and an undue flowing of the same outwardly of the open end of the fitting, and in order to assure a binding over the entire peripheral area of the inserted portion of the pipe 21, it is desirable that the solder at the open end of the fitting be congealed as quickly as possible and to this end I have provided the radiating members 15 and 16.

In this way I have provided a fitting of this nature which is economical to manufacture and most durable and efficient in use and in which the machining is reduced to a minimum as no solder receiving passages are necessary on the inner surface of the pipe receiving portion.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A fitting of the class described, comprising: a pipe receiving portion having a pipe receiving bore therein; a seat at the inner end of said bore for engaging the end of a pipe inserted therein; interiorly threaded nozzle on the periphery of said pipe receiving portion inclined to the axis thereof; and a hollow plug threaded in said nozzle engaging with the pipe inserted in said bore for forcing the same against said seat.

2. A fitting of the class described, comprising: a pipe receiving portion having a pipe receiving bore therein; a seat at the inner end of said bore for engaging the end of a pipe inserted therein; interiorly threaded nozzle on the periphery of said pipe receiving portion inclined to the axis thereof; a hollow plug threaded in said nozzle engaging with the pipe inserted in said bore for forcing the same against said seat; and a layer of tin on the inner surface of said bore, said bore having a plurality of spaced pockets formed in its inner surface.

In testimony whereof I have signed the foregoing specification.

ANDREW TEN BROOK.